(12) United States Patent
Amaral et al.

(10) Patent No.: US 11,713,259 B2
(45) Date of Patent: Aug. 1, 2023

(54) CONTAINERIZED DESALINATION SYSTEM

(71) Applicant: Fluence Water Israel Ltd., Caesarea (IL)

(72) Inventors: Avraham Israel Amaral, Caesarea (IL); Ravid Levy, Caesarea (IL); Phil Elovic, Caesarea (IL)

(73) Assignee: FLUENCE WATER ISRAEL, LTD., Caesarea (IL)

( * ) Notice: Subject to any disclaimer, the term of this patent is extended or adjusted under 35 U.S.C. 154(b) by 71 days.

(21) Appl. No.: 17/099,771

(22) Filed: Nov. 16, 2020

(65) Prior Publication Data

US 2021/0214244 A1 Jul. 15, 2021

Related U.S. Application Data

(62) Division of application No. 15/772,808, filed as application No. PCT/US2017/051842 on Sep. 15, 2017, now Pat. No. 10,836,656.

(Continued)

(51) Int. Cl.
*C02F 1/44* (2023.01)
*B01D 65/02* (2006.01)
(Continued)

(52) U.S. Cl.
CPC .............. *C02F 1/444* (2013.01); *B01D 29/52* (2013.01); *B01D 29/66* (2013.01); *B01D 61/025* (2013.01); *B01D 61/145* (2013.01); *B01D 61/16* (2013.01); *B01D 61/58* (2013.01); *B01D 65/02* (2013.01); *C02F 1/004* (2013.01); *C02F 1/441* (2013.01); *B01D 61/08* (2013.01); *B01D 61/18* (2013.01);
(Continued)

(58) Field of Classification Search
None
See application file for complete search history.

(56) References Cited

U.S. PATENT DOCUMENTS

| 2007/0181496 A1 | 8/2007 | Zuback |
| 2011/0049048 A1 | 3/2011 | Benner et al. |

(Continued)

FOREIGN PATENT DOCUMENTS

| EP | 2727644 A1 | 5/2014 |
| WO | 2012037274 A2 | 3/2012 |
| WO | 12/098969 A1 | 7/2012 |

OTHER PUBLICATIONS

Philippines Subsequent Examination Report in corresponding patent application No. 1/2019/500565, dated Mar. 15, 2019, 4 pages.

(Continued)

*Primary Examiner* — Bradley R Spies
*Assistant Examiner* — Jeannie McDermott
(74) *Attorney, Agent, or Firm* — Oliff PLC

(57) ABSTRACT

A water desalination system includes a first set of ultrafiltration membranes, a second set of ultrafiltration membranes, a first backwashing system configured to treat at least one of the first set of ultrafiltration membranes or the second set of ultrafiltration membranes with brine generated by a reverse osmosis process, and a second backwashing system configured to treat at least one of the first set of ultrafiltration membranes or the second set of ultrafiltration membranes with one or more chemicals and reverse osmosis permeate water.

15 Claims, 7 Drawing Sheets

Related U.S. Application Data

(60) Provisional application No. 62/395,317, filed on Sep. 15, 2016.

(51) Int. Cl.
| | |
|---|---|
| *B01D 61/02* | (2006.01) |
| *B01D 61/58* | (2006.01) |
| *B01D 29/52* | (2006.01) |
| *B01D 29/66* | (2006.01) |
| *B01D 61/14* | (2006.01) |
| *B01D 61/16* | (2006.01) |
| *C02F 1/00* | (2023.01) |
| *B01D 61/18* | (2006.01) |
| *B01D 61/08* | (2006.01) |
| *C02F 103/08* | (2006.01) |

(52) U.S. Cl.
CPC ............... *B01D 2201/202* (2013.01); *B01D 2311/2649* (2013.01); *B01D 2313/20* (2013.01); *B01D 2313/246* (2013.01); *B01D 2313/54* (2013.01); *B01D 2317/025* (2013.01); *B01D 2317/04* (2013.01); *B01D 2317/06* (2013.01); *B01D 2321/04* (2013.01); *B01D 2321/12* (2013.01); *B01D 2321/14* (2013.01); *B01D 2321/16* (2013.01); *B01D 2321/20* (2013.01); *C02F 2103/08* (2013.01); *C02F 2303/16* (2013.01); *Y02A 20/131* (2018.01)

(56) References Cited

U.S. PATENT DOCUMENTS

| | | | |
|---|---|---|---|
| 2014/0048483 A1 | 2/2014 | Maeda et al. | |
| 2017/0209834 A1* | 7/2017 | Cohen | C02F 1/008 |

OTHER PUBLICATIONS

European Communication pursuant to Article 94(3) EPC in corresponding patent application No. 17851630.8, dated Jan. 22, 2021, 5 pages.

* cited by examiner

CONTAINERIZED DESALINATION SYSTEM

PRIORITY CLAIM

This application is a divisional of U.S. patent application Ser. No. 15/772,808 filed May 1, 2018 (now U.S. Pat. No. 10,836,656), which is a U.S. National Stage Filing under 35 U.S.C. 371 from International Application No. PCT/US2017/051842 filed Sep. 15, 2017 and published as PCT/US2017/051842 on Mar. 22, 2018, which is related to and claims the benefit of priority to U.S. Patent Application No. 62/395,317, filed Sep. 15, 2016, which applications and publications are incorporated herein by reference in their entirety.

TECHNICAL FIELD

Aspects and implementations of the present disclosure relate to water desalination systems.

BACKGROUND

Water desalination is a process that extracts minerals from saline water. Various desalination methods can be employed such as reverse osmosis.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
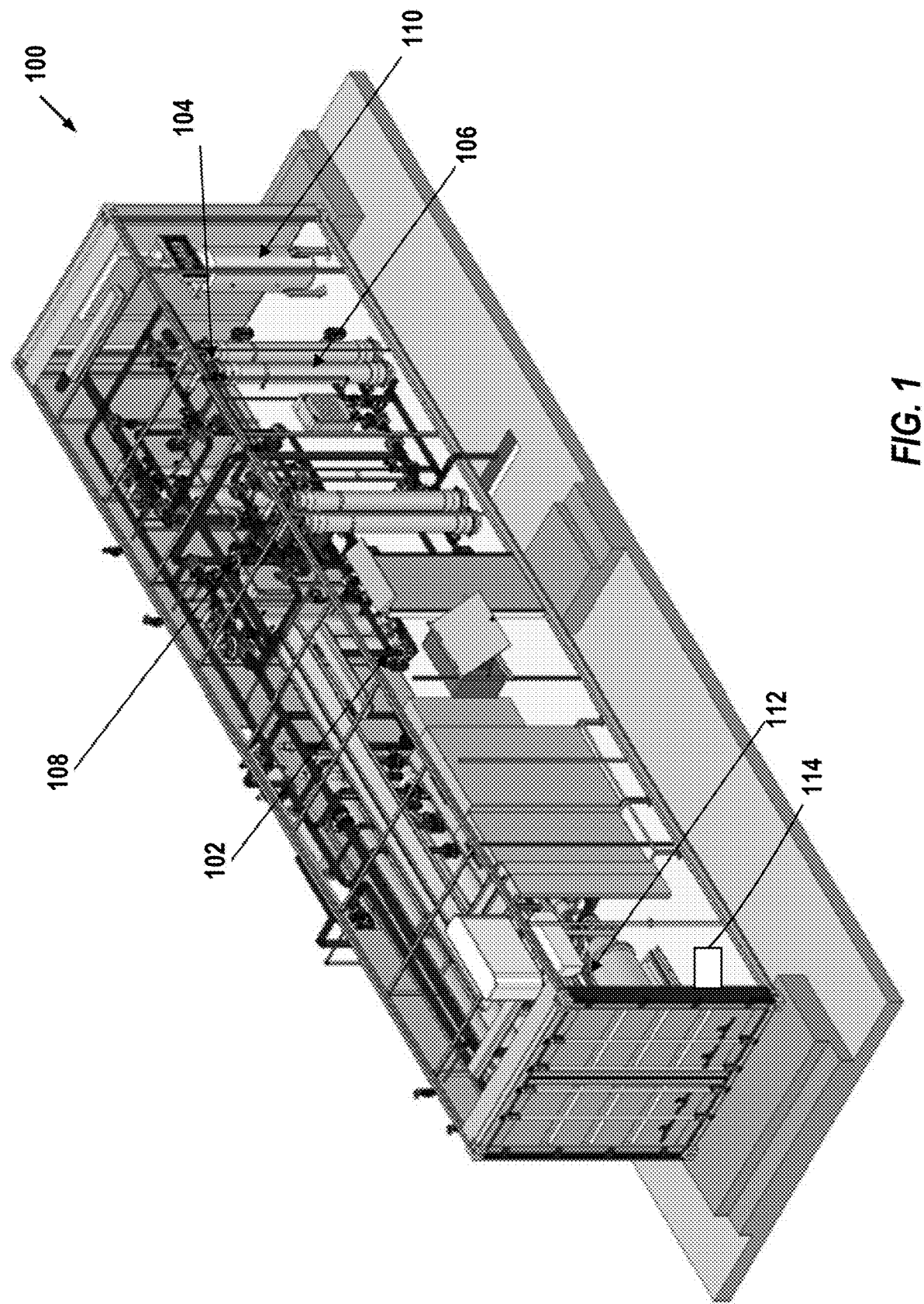
FIG. 1 illustrates an example system, in accordance with an example embodiment.

Aspects and implementations of the present disclosure are directed to water desalination and desalination systems. As described in detail herein, the disclosed technologies may be implemented in a single, standalone container (e.g., a complete plant, mounted in a 40-foot temperature controlled container), while in other implementations the described technologies may be configured differently and/or distributed across multiple containers, structures, etc. It should be understood that a single container may allow quick installation and easy operation of the technologies, providing a solution for seawater desalination with low energy and/or chemical consumption.

In certain implementations, the described technologies include or otherwise incorporate a pretreatment system, as described herein. Such a pretreatment system may include one or more disc filters (DF) and/or ultra-filtration (UF) membranes. In doing so, continuous operation can be ensured (e.g., at raw water quality up to 20 Nephelometric Turbidity Units (NTU)).

Additionally, in certain implementations the described technologies can be configured to utilize reverse osmosis (RO) brine for backwash, e.g., of the UF membranes. In doing so, recovery can be increased and savings on backwash equipment can be realized.

Moreover, in certain implementations high flux/low energy reverse osmosis membranes can be utilized. Such membranes are used to remove dissolved solids in seawater by the mechanical process which reverses and overcomes the osmotic pressure of sea water by passing water through the membranes while salts are retained. In doing so, operating pressure can be reduced energy savings can be realized.

In certain implementations, the described technologies can be configured to enable direct feeding from UF to RO. In doing so, the need for an intermediate tank, cartridge filter and/or low-pressure pump (as in existing systems) can be eliminated, thereby reducing operating costs & footprint of the system.

Additionally, in certain implementations the described technologies can include one or more efficient piston high-pressure pump(s) and/or advanced energy recovery device(s) (ERD) 112. In doing so, significant amounts of energy costs can be reduced, as compared to units without (ERD). Such an ERD can utilize isobaric chambers technology, and can maximize energy efficiency of the seawater RO, by recovering the residual pressure (energy) contained in the brine rejection and transferring it to the RO feed water. The brine is collected and directed to the ERD and its pressure is mechanically transferred is to a portion of the incoming feed water from the intake. Because of friction losses and differential pressure ($\Delta P$) of the membranes, a booster pump in series with the ERD, can be used to align with the pressure of the remaining feed the pump intake system. Additionally, in certain implementations the referenced ERD can include a pressure exchanger integrated with and booster pump and an electric motor.

The described technologies can also enable lower levels of chemical consumption (as compared to existing systems). For example, in certain implementations the osmotic differential pressure in the backwash (BW) and chemical enhanced backwash (CEB) of the UF can be used to achieve a biocide effect (thereby reducing chemical consumption in the system).

Additionally, in certain implementations the pumps of the described system can be equipped with variable frequency drive (VFD). In doing so, a wide/flexible operating range can be achieved.

The described technologies can also be configured to operate in a fully automatic manner, with high availability and low maintenance, as described herein.

Figure 2:
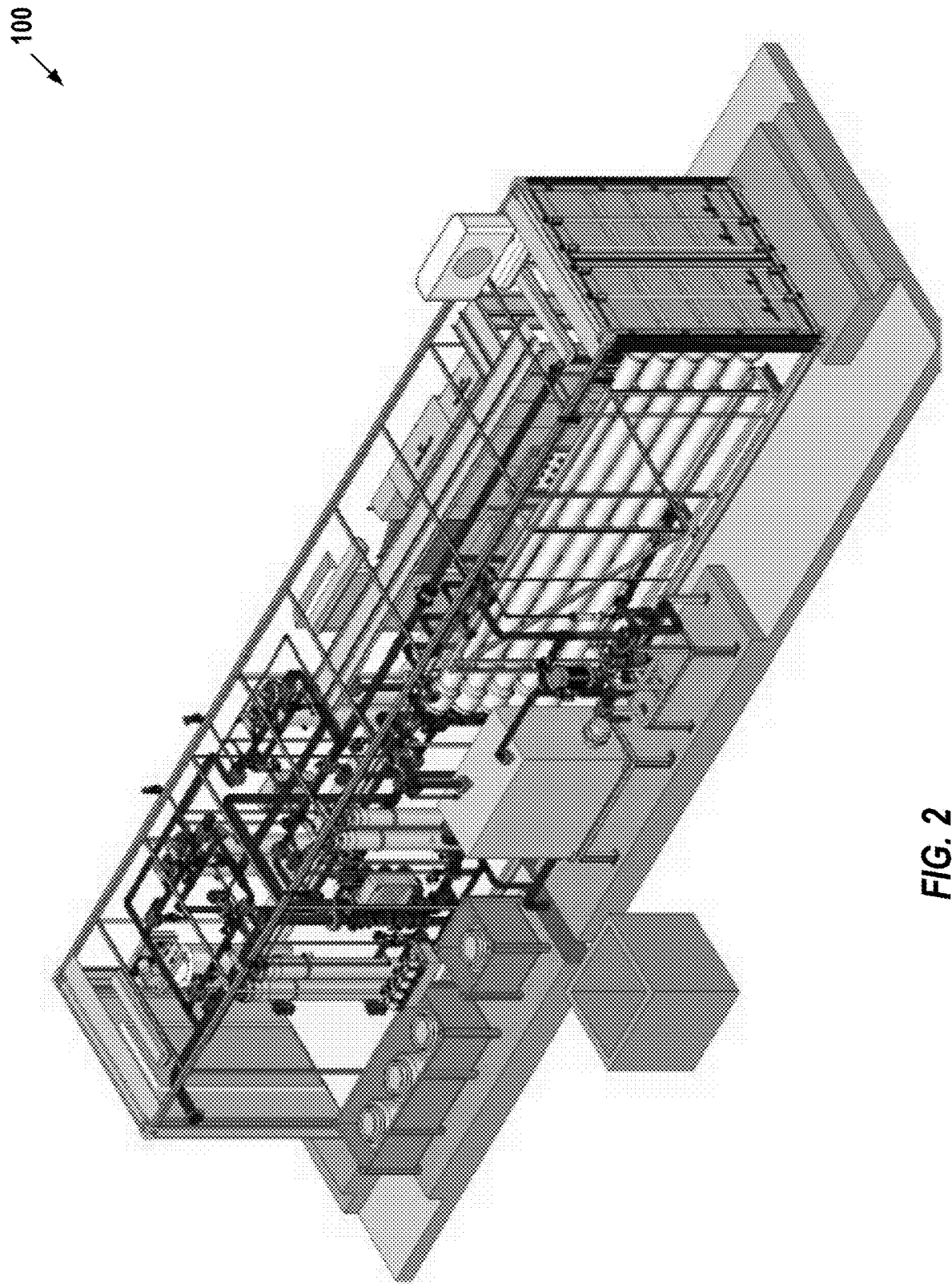
FIG. 2 illustrates an example system, in accordance with an example embodiment.
Figure 3:
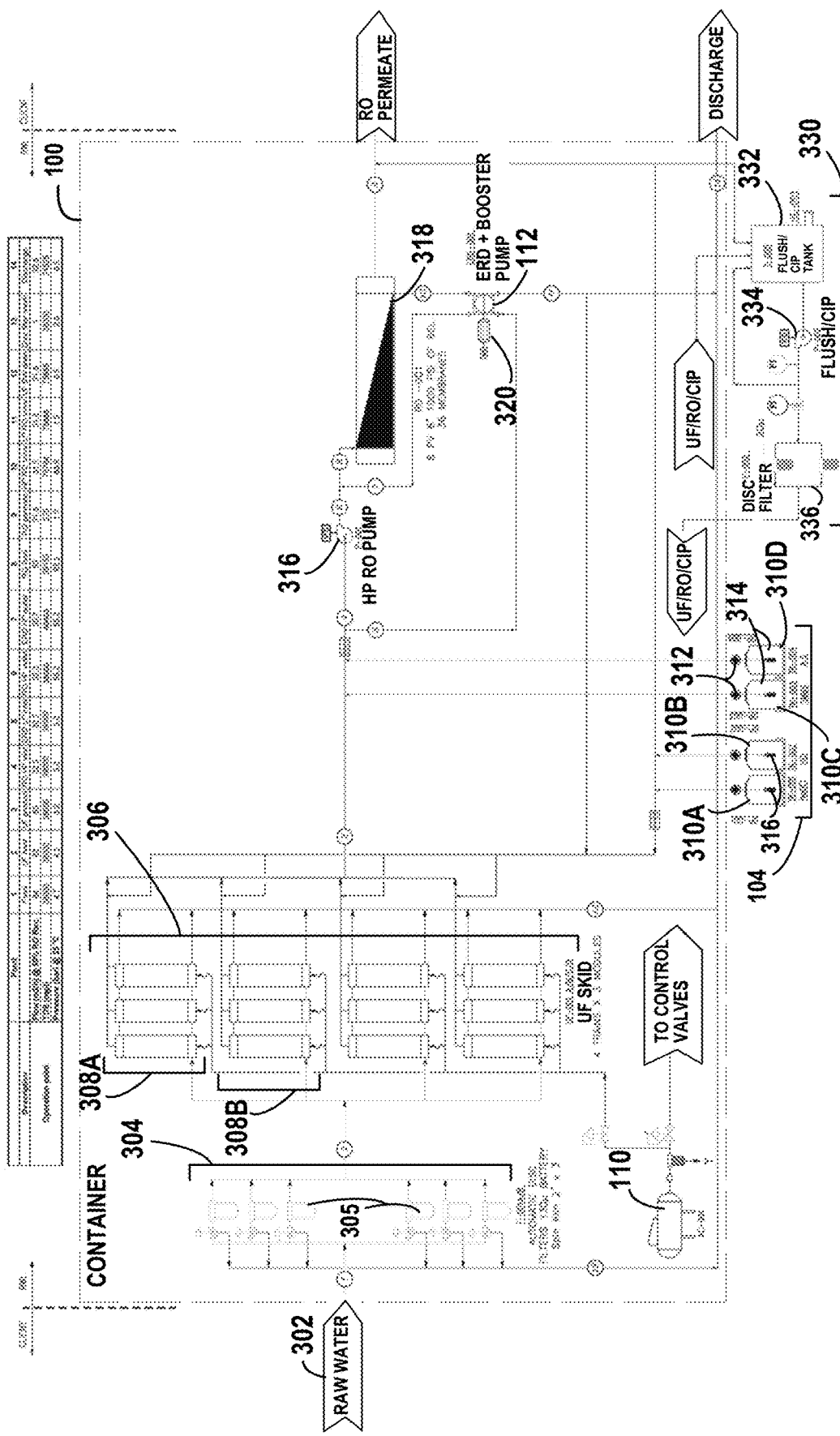
FIG. 3 illustrates an example system, in accordance with an example embodiment.

FIG. 1 depicts one exemplary embodiment of the described system 100 (further aspects of the system are also shown in FIGS. 2 and 3). In certain implementations, system 100 includes a disc filter system for retention of suspended solids (e.g., up to 130 microns), e.g., during a pretreatment process. For example, as shown in FIG. 3, water such as raw water 302 can be received by system 100 and provided to disc filter system 304 which can include one or several disc filters 305. Such disc filters 305 can be designed or configured for coarse filtration (e.g., prior to providing the water to UF membranes). The disc filtration system 302 can capture and retain large quantities of solid particles, such as organic solids & algae.

As turbid water 302 flows through the filter(s) 305, waste can be captured in the outer wall and/or the inner grooves of a stack of compressed discs. During an automatic cleaning cycle, the pack can be decompressed, while a series of nozzles direct streams of water at high pressure between the disks, causing the disks to spin and rinse. At the end of the backwash cycle, the discs pack can be recompressed and the system returns to the filtration cycle. The system is thus fully automatic, self-cleaning, corrosion resistant, easy to operate and maintain. It should be understood that system 100 can be configured to provide the necessary flow of filtered water to the UF feed even during backwash operations.

The system also includes an ultrafiltration (UF) system 306 for retention of suspended solids, as shown in FIG. 3. Utilizing such a UF system can ensure, for example, levels of 0.2 NTU turbidity and SDI less than 2.5, thus providing effective protection for the reverse osmosis membranes. The UF system can include ultrafiltration (UF) membrane(s) to remove fine particulate matter. This technology is used in water treatment, and as a pretreatment process to feed the reverse osmosis membranes. Compared with multimedia filters, ultrafiltration technology has the advantage of its ability to eliminate germs, microorganisms, etc. from water. The pores of such membrane(s) can be small enough to even prevent viruses passing through them (e.g., about 20 nm).

In certain implementations, system 100 can include a control system 114. Such a control system can be or include a programmable logic controller (PLC) and/or another computing device (or devices) configured to communicate with the various components described herein. Control system 114 can control and/or configure system 100 in accordance with various operations, processes, etc., such as modes of the ultrafiltration process including but not limited to filtration, backwashing and CEB.

Figure 4:
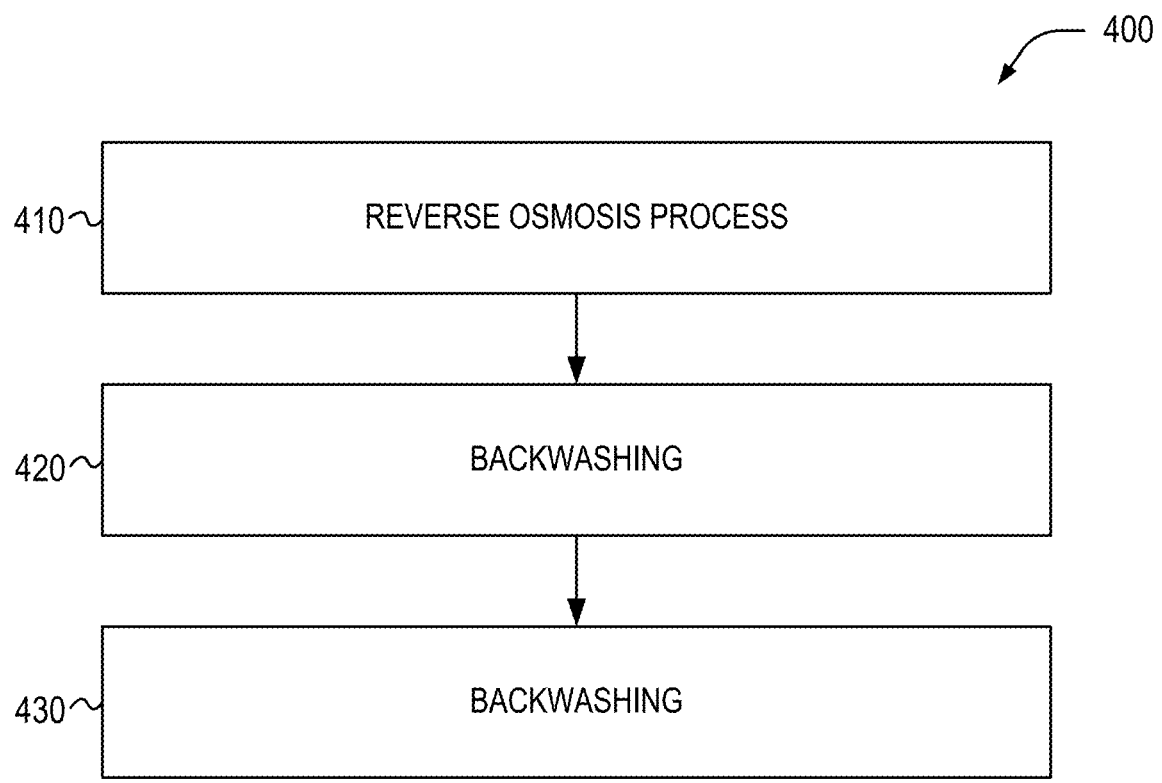
FIG. 4 is a flow chart illustrating a method, in accordance with an example embodiment described herein.

FIG. 4 is a flow chart illustrating a method 400, according to an example embodiment, for containerized desalination system backwashing. The method is performed by the various components described herein, such as in system 100. In other implementations, the one or more blocks of FIG. 4 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

At operation 410, water is passed through a reverse osmosis process, e.g., as described herein. At operation 420, a first set of ultrafiltration membranes or a second set of ultrafiltration membranes can be backwashed, e.g., with brine generated by the reverse osmosis process. At operation 430, at least one of the first set of ultrafiltration membranes or the second set of ultrafiltration membranes can be backwashed with one or more chemicals and reverse osmosis permeate, e.g., as described herein. Further aspects of the referenced method are described in detail herein.

System 100 can also include a UF backwash system 102. In certain implementations, the backwash system can perform backwashes using RO brine, as described herein. In doing so, the total recovery of the system can be increased and energy can be saved. Additionally, system 100 can be configured to use brine from the RO process to perform the UF backwash, e.g., with a direct feed, using the residual pressure in the brine flow. In doing so, the need for a pump for this specific function can be eliminated, and energy can be saved. As a further advantage, the use of brine in such processes inhibits the growth of microorganisms on the surface of the UF membrane, as a disinfecting effect is provided by the difference between the osmotic potential between seawater and brine.

Additionally, as noted, in certain implementations UF membranes are used for pre-treatment of the water prior to feeding the water into the desalination stage. In certain implementations, the UF membranes can be cleaned periodically using water backwash to remove solids and fouling that accumulate on the membrane. In lieu of backwashing using UF permeate water (as in existing systems), the described technologies can be configured to enable a backwashing using brine, e.g., from the desalination stage. Since RO brine is a 'waste' stream', its use as the backwash saves valuable UF permeate and therefore increases the overall system's recovery & efficiency. The brine can be pressurized and its use for UF backwash can eliminate the need for special equipment that otherwise would be required to perform the backwash (e.g., tank & pumps). This contributes to space, energy & cost saving. Additionally, the high salinity in the brine can also prevent/eliminate biological fouling on the UF membranes due its high salinity that periodically creates 'osmotic shock' that does not allow bacteria to proliferate. This can contribute to reduction in chemical disinfection of the UF membrane thus saves chemical costs and reduces environmental impact.

Moreover, in certain implementations the described technologies can include UF configuration at multiple (e.g., 4) independent trains 106 of UF membranes. By way of further illustration, as shown in FIG. 3, UF system 306 can include UF train 308A and UF train 308B (as well as other UF trains). Such a configuration allows direct continuous feed of seawater reverse osmosis (SWRO) permeate. Additionally, such a configuration can enable continuous operation of the RO even during UF backwash (BW) and chemical enhanced backwash (CEB) processes (as described herein). In certain implementations, the described configuration can enable such BW and CEB processes to be performed even without an intermediate tank, RO feed pump and/or safety cartridge filter. Such a configuration can reduce the footprint of the system, equipment cost & energy use by the system.

As noted above, system 100 can include a control system 114. In certain implementations, control system 114 can synchronize or otherwise monitor and/or adjust the operation of the referenced UF trains (and/or other components described herein). For example, by synchronizing operation of the referenced trains, in a scenario in which one train is undergoing a cleaning process (e.g., BW, CEB, etc., as described herein) other train(s) can remain in operation. In doing so, RO operation of the system 100 can remain stable/consistent. In certain implementations, the feed water pressure can be supplied by the raw water feed pump (e.g., 302) directly through the pre-filtration stages into the RO.

Additionally, in certain implementations the system 100 can include tank/air compressor 110. Such a tank/compressor 110 can be configured to utilize compressed air during the UF backwashing (e.g., in lieu of a blower).

The system 100 can also include a chemical enhanced backwash (CEB) system 104. In certain implementations, the UF elements (CEB) can be cleaned using RO permeate.

In doing so, the amount of chemicals used (e.g., NaOCl and HCl) can be significantly reduced (as compared to existing systems). The system may be configured to perform the chemical cleaning automatically (e.g., once every 24 hours or at other intervals). Doing so can, for example, prevent biological contamination on UF membranes of UF system 306. In certain implementations, such an automatic chemical enhanced backwash process can be performed on UF membrane(s) in order to prevent biofilm and scale formation on the membranes surface.

In certain implementations, CEB system 104 can use the RO permeate water in conjunction with has various chemical dosing systems (e.g., for 35% HCl and 10% NaOCl solutions). For example, FIG. 3 depicts various dosing systems within CEB system 104. As shown in FIG. 3, dosing system 310A can be a dosing system for NaOCl, while dosing system 310B can be a dosing system for HCl. In certain implementations, each of the referenced dosing system(s) can include a dosing pump 312, a tank (e.g., a High-density polyethylene (HDPE) tank), valve(s) 316 (e.g., anti-siphon valves) and/or a spill containment bund.

By way of further illustration, it can be appreciated that in desalination systems, the UF membranes may need to be cleaned periodically, e.g., by chemicals that are dosed into the backwash water (CEB). In many cases CEB is done with same water as the water backwash (i.e., saline UF permeate). In the described technologies, such as in system 100, the use of desalinated water (RO permeate) instead of seawater for CEB can significantly reduce the quantity of chemicals required to reach the desirable pH for the caustic CEB operation, due the elimination of the buffering effect caused by the seawater's alkalinity & dissolved salts. In certain implementations, the described technologies can utilize a direct connection from the RO permeate into the UF backwash system with chemicals dosing into the permeate line, e.g., as shown in FIG. 3.

In addition, the use of the low salinity water (RO permeate) for CEB, further in combination of high salinity RO brine for backwash, results in high 'osmotic shock'. This contributes to prevention of biofilm formation at the UF membranes, due to 'osmotic shock' and also further reduces the required quantity of chlorine application during the CEB operation.

In certain implementations, the system can include an anti-oxidant (e.g., sodium metabisulfite—'SMBS') dosing system 310C. Such a dosing system can be used in the manner described herein to prevent oxidation of the RO membranes. Additionally, a scale inhibitor (anti-scaling) dosing system can be used in the manner described herein to prevent accumulation of salt (scaling), e.g., in reverse osmosis membranes.

A high pressure pumping system 316 can be configured with respect to the RO membranes 318. In certain implementations, such a system may include a piston pump and energy recovery device 112 by isobaric pressure exchanger type conjugated with a booster pump 320.

Additionally, in certain implementations the described RO system may include fiberglass (FRP) pressure vessels and high flux/ultra-low pressure seawater reverse osmosis (SWRO) membranes. For example, in certain implementations system 100 can be configured with 8 pressure vessels for 6 elements, with a multiport system that eliminates the need for interconnections. The pressure vessels can be designed for an operating pressure greater than 1000 psi (69 bar).

In certain implementations, system 100 can also include a flush and clean in place (CIP) system 330. Such a CIP system 330 can be configured to perform rinsing operations automatically, e.g., in scenarios in which the RO system is stopped for a defined period of time (e.g., more than 15 minutes). Additionally, the referenced rinsing and CIP unit can be configured for periodic deep cleaning of RO/UF membranes. In certain implementations, CIP system 330 can include a tank 332 (e.g., a 2,500 liter PP tank with 25 kW heater), a centrifugal pump 334 with an electric motor and variable frequency drive (VFD), and a disk filter.

Moreover, in certain implementations a potabilization system can be included. For example, if the desalinated water is used for drinking, system 100 can be equipped with an optional $Na_2CO_3$ chemicals dosing and/or calcite filters to restore hardness to desired/required levels, and to adjust the pH, as well as dosage of sodium hypochlorite (NaOCl) to prevent drinking water biological re-contamination.

Various analytical instruments, sensors, etc. can also be included in system 100. Such instruments, sensors, etc. can, for example, enable remote devices, transmitters, etc. to control the flow, pressure, pH, conductivity, and temperature at various points, e.g., as described herein. Additionally, such sensors, instruments, etc., can be connected to and/or otherwise configured in relation to control system 114.

Moreover, in certain implementations various additional components can be included and/or otherwise incorporated/integrated into system 100, including but not limited to: a beach well intake pumping system, a pumping system for seawater from the raw water tank, a multimedia filter, re-mineralization by injection of sodium bicarbonate and calcium chloride solution, re-mineralization by calcite (CaCO3) filters system, post-chlorination by injection of sodium hypochlorite (NaOCl), permeate polisher by RO second pass, and/or permeate polisher by CEDI.

In certain implementations, system 100 can also include a vertical disc filter battery 108, which can also serve to reduce the footprint of the system, as shown.

Accordingly, described herein is water desalination system. In various implementations the system includes a first set of ultrafiltration membranes, a second set of ultrafiltration membranes, a first backwashing system configured to treat at least one of the first set of ultrafiltration membranes or the second set of ultrafiltration membranes with brine generated by a reverse osmosis process, and a second backwashing system configured to treat at least one of the first set of ultrafiltration membranes or the second set of ultrafiltration membranes with one or more chemicals and reverse osmosis permeate water.

Implementing the described technologies can provide substantial benefits and advantages. For example, the described technologies can adjust, improve, and/or optimize operation of the described system(s) (e.g., desalination units, plants, etc.). Doing so can achieve efficiencies and/or savings, e.g., through optimization of various operations and maintenance cost factors. For example, as described herein, the described technologies can improve/optimize hardware maintenance (by increasing service life of the hardware), chemical consumption, energy consumption (by optimizing/improving flow rates and process parameters, and of the recovery for brackish water plants), manpower and/or plant availability. In addition, improving plant availability and reliability can further reduce the need for various design safety factors and can lower equipment redundancy thus further preserving resources.

Figure 5:
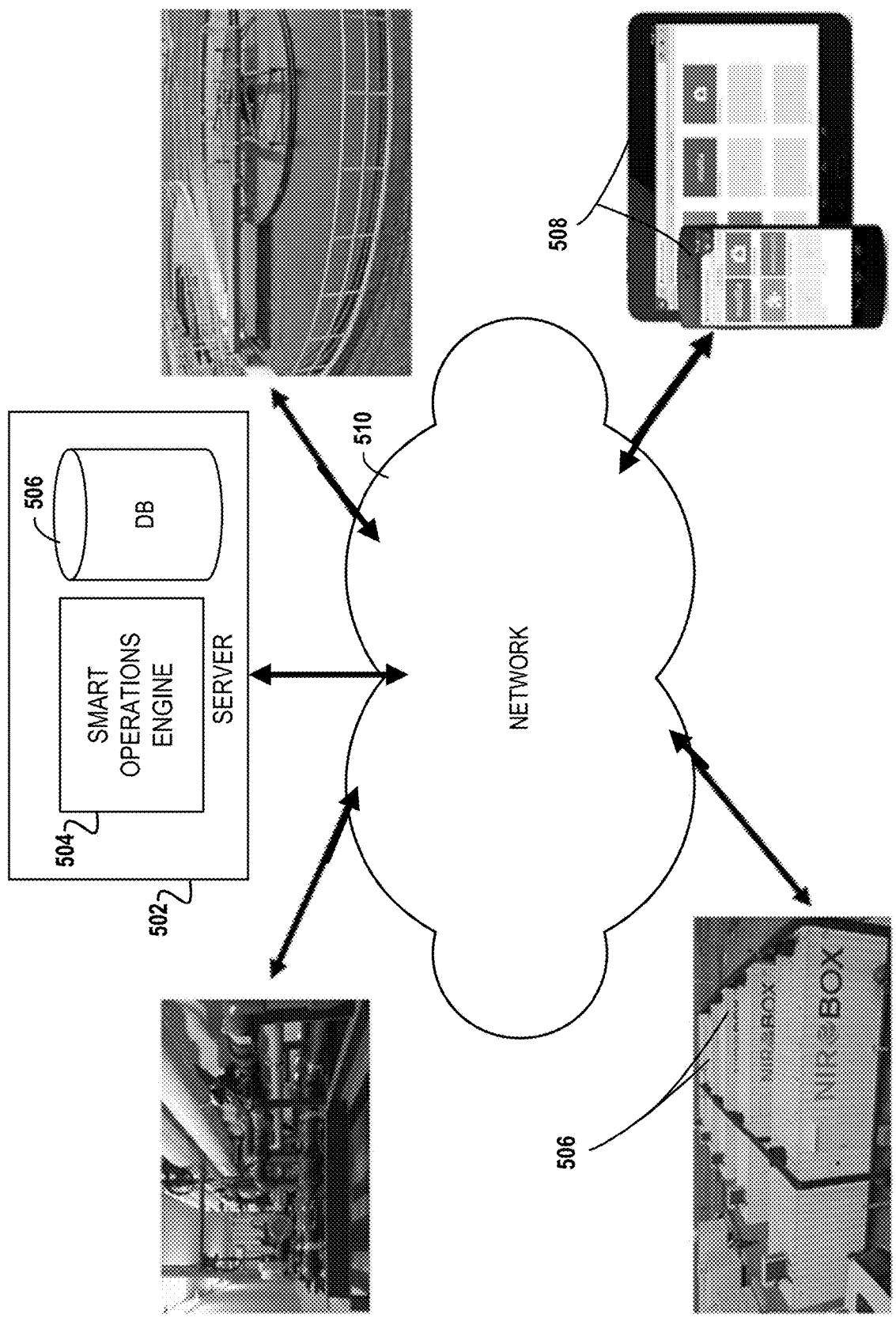
FIG. 5 illustrates an example scenario described herein, according to an example embodiment.

As described herein, smart operations engine can be configured to collect, generate, and/or provide sophisticated automatic diagnostics and performance reports, e.g., based on the data collected from a monitoring system (e.g., control system 114 as described above). For example, FIG. 5 depicts an example server 502 that executes or otherwise implements smart operations engine 504 (which can be an application, module, etc., executing on server 502 and/or any other such computing device(s)). Server 502 can be connected to and/or communicate with various plants, sites, etc., e.g., via a network 510 (e.g., the Internet) as shown in FIG. 5. Upon analyzing or otherwise processing such data, smart operations engine can generate and/or otherwise implement various adjustments, e.g., to maximize the operation of the plant. Doing so enables real-time analysis of the plant performance, and can identify latent performance issues, performance degradation, and/or other inefficiencies. Additionally, having identified such phenomena, smart operations engine can generate and/or provide various recommendations, corrective measures and/or performance optimization adjustments.

In certain implementations, the described techniques can be employed as methods, such as may be performed by processing logic that can comprise hardware (circuitry, dedicated logic, etc.), software (such as is run on a computing device such as those described herein), or a combination of both. In one implementation, these methods 400 is performed by one or more elements depicted and/or described in relation to FIG. 1 (including but not limited to control system 114), while in some other implementations, the operations can be performed by another machine or machines (e.g., server 502).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

To further improve the analysis and the operation of the plant(s)/system(s), and track environmental and operational trends, smart operations engine can further utilize various machine learning techniques. Such techniques can optimize the plant operations and performance, e.g., based on a database of operational data collected (e.g., over several plants), as well as from each specific plant itself. For example, using machine learning techniques, the normal and dynamic trends of plant operations and optimization techniques within the plant, can be determined. Additionally, in certain implementations the described technologies can quickly identify operating parameters deviating from optimal performance. This information can be leveraged for preventive maintenance and/or machine and system optimization improvements.

As noted above, the described technologies, including smart operations engine, can be configured to improve the operation and maintenance of water treatment and desalination systems. For example, in certain implementations smart operations engine can automatically collect/receive operational and process data from various water desalination systems (e.g., from various sensors, components, etc.). Such data can be processed/analyzed (e.g., using machine learning (ML) techniques), and various determinations, etc., can be computed, as described herein.

In certain implementations, various operational parameters can be measured at various points at each desalination plant. These parameters can include flows, pressures, temperatures, analytical parameters (pH, ORP, EC, etc.) and others. In addition, various mechanical and electrical parameters can be also monitored, e.g., to assess the operation status of a system (e.g., frequency of various motors, power consumption, valve positions etc.). Such data can be transmitted (e.g., by control system 114 of a particular system) to smart operations engine which can also receive/collect data from other connected desalination plants. Such data can be logged/stored in a database. Additionally, smart operations engine can utilize machine learning and other techniques to analyze such data and identify trends, anomalies (and trigger alarms in response), generate preventative maintenance activities in response, etc.

Figure 6:
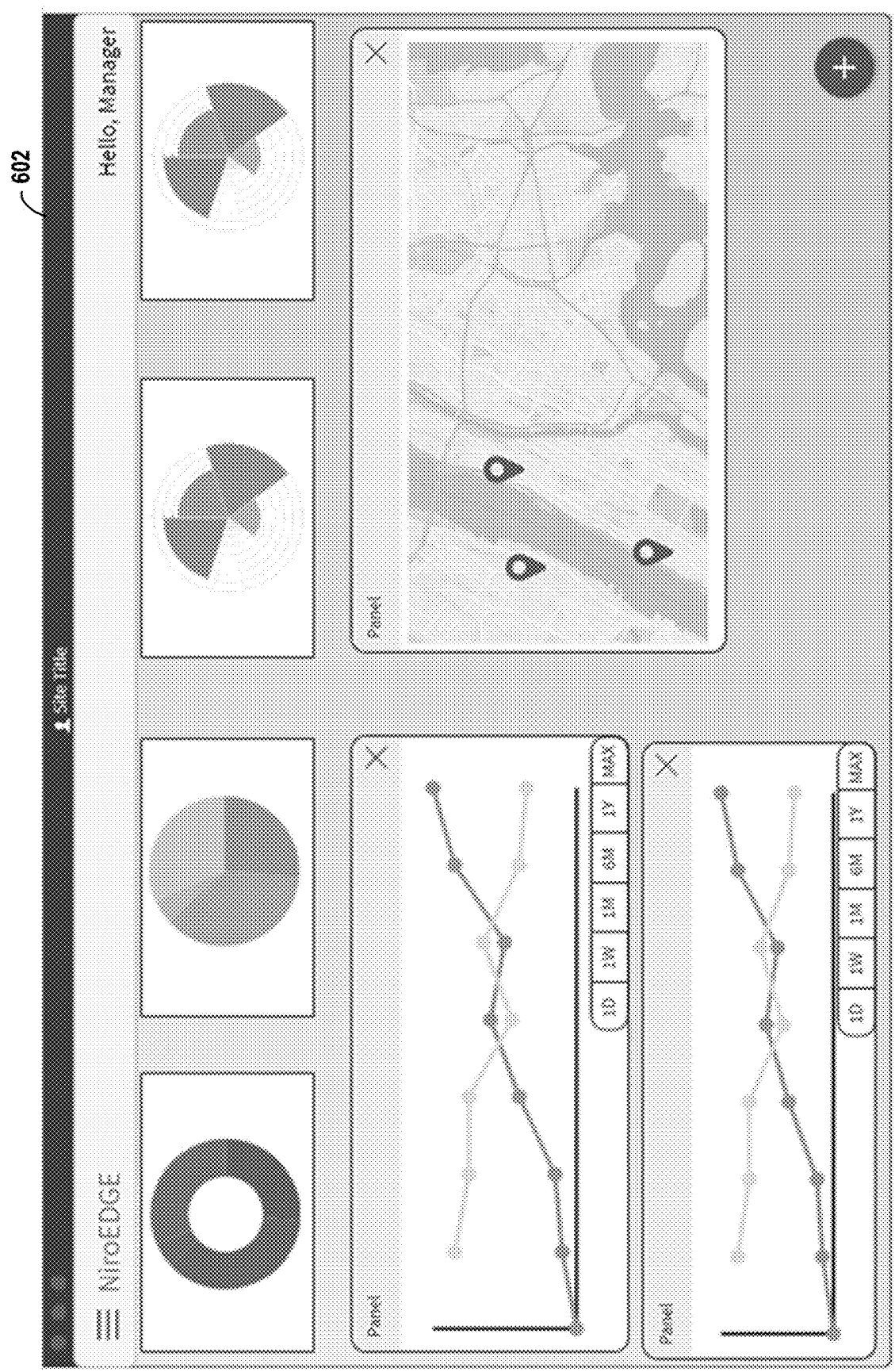
FIG. 6 illustrates an example scenario described herein, according to an example embodiment.

The analyzed data can be displayed to users via various user interfaces, e.g., web or mobile interfaces. For example, FIG. 6 depicts an example user interface 602 such as a dashboard that can be provided on various computing devices 508 (PC, tablet, smartphone, etc.) and operating systems (Windows, Apple OS etc.). Such a user interface can provide/present the analyzed data, e.g., for remote viewing by various operators, managers, process engineers, etc. (each of which can be provided different access credentials). This can allow remote assistance and support for clients, e.g., based on real-time data analysis.

Smart operations engine 504 can communicate (e.g., via secured web link or other network connections) with various desalination systems/plants 506. Monitored data can be received, e.g., from each plant, and compared, combined, etc. with historic and/or current data from other plants (e.g., data that went through the ML algorithms analysis). In doing so real-time feedback on operational data can be generated and provided. Such analysis can enable ongoing optimization and fine-tuning of system operation and set-points, as described herein. The operation will be adjusted via controlled elements such as motors VFDs, actuated valves and controlled dosing pumps. In doing so, the described technologies can generate and provide real-time feedback, e.g., with respect to operational changes of one or several systems.

It should be understood that while the described technologies may be described with respect to seawater desalination (e.g., UF and RO-based), this is only by way of example. Accordingly, the described technologies can also be configured and/or utilized with respect to other technologies, such as brackish water desalination and UPW systems (UF, RO, and electrodeionization (EDI)-based), and biological wastewater treatment systems (membrane aerated biofilm reactors (MABR), moving bed bioreactor (MBBR), Membrane bioreactor (MBR), etc.).

In certain implementations, the described technologies generate alerts (e.g., for maintenance), e.g., upon determining that various data metrics have exceeded defined thresholds. Additionally, in certain implementations historical data and/or trends can be analyzed (e.g., using machine learning and artificial intelligence techniques) and utilized to predict/anticipate problems, malfunctions, etc. (and provide related alerts) before such problem(s) occur (e.g., using machine learning and artificial intelligence techniques).

Additionally, in certain implementations smart operations engine 504 can be configured to optimize various operations, e.g., of various plants, systems, facilities, plants, boxes and/or sensors, such as those described herein. For example, using machine learning techniques, multiple metrics, parameters, etc., can be analyzed, e.g., over a period of time. In doing so, inefficiencies can be identified and operation of various components, etc., can be adjusted to optimize performance.

As noted above, in certain implementations, the described data can be presented/depicted to various users via a graphical user interface such as is depicted in FIG. 6. It should be understood that various users may have different roles and thus different data may be relevant to such users. Accordingly, in certain implementations the described interface can be customized for one type of user (e.g., a manager) to depict data such as site production rate (m3/hr), relative production rate, energy consumption (kW/hr), product quality, etc. For another user (e.g., a process engineer) the described interface can be customized to depict: feed Flow (m3/hr), feed pressure (bar), feed temperature (oC), product flow (m3/hr). In other implementations, various other graphical elements can be used to depict the data described herein, such as: a feed flow chart, a feed pressure chart, a feed temperature chart, a total product flow chart, a concentrate flow chart, a product connectivity chart, a TMP UF chart, a RO inlet pressure chart, a delta pressure RO chart, a recovery percentage chart, a chemical level percentage chart, and a Timer (e.g., hours and/or lifetime).

Additionally, in certain implementations the described interface can graphically depict various plants, systems, facilities, etc., e.g., on a map. Various indicators/markers can reflect the state of the plant, system, site, etc. For example, a green marker can reflect that the site is operating normally/optimally (e.g., no warnings/errors have been detected), while a yellow marker reflects that warnings are present (e.g., within one of the groups), and a red indicator can reflect a site with errors.

In certain implementations, upon selecting such an indicator (e.g., on a map, corresponding a plant, site, system, etc.), the user can be presented with an overview of the site health status. Additionally, information from various components, sensors, etc., within such a site can be collected/updated to depict real-time values.

In certain implementations, a graphical user interface depicting such a site view can include or incorporate data/metrics such as site production rate, relative production rate, energy consumption, product quality, a map of the available groups, and alerts (e.g., an aggregation of all the alerts from various groups).

By integrating the described data and analytics techniques, the operation of the described plants and systems can be improved and enhanced with additional features. Accurate and site-specific data can be collected, e.g., regarding precise feed water conditions and seasonal variations, thereby enabling the operation of each plant in an optimized mode. Additionally, accurate assessments of the impacts of variable feed conditions, collected over multitudes of plants (and/or historical data), on plant operation, can also provide valuable insight for design and optimization of other plants.

By way of illustration, it can be appreciated that each plant may have its own characteristics, performance curves, etc., that depend on the system design and ambient conditions. For example, in certain scenarios a desalination plant is operated at off-design point due to lower capacity requirement, reduced membrane performance, etc. In such a scenario, smart operations engine 504 can process/analyze data, metrics, etc., from the various components of the plant. In doing so, optimal set points for various key parameters can be determined.

For example, smart operations engine 504 can compute various pretreatment (multi□media filter (MMF) and UF) optimizations to continuously improve the pretreatment process, e.g., within a desalination system (such as is described herein). In certain implementations, both MMF and UF can suffer from instable operation that may lead to higher than expected pressure drops (DP or transmembrane pressure (TMP)), higher than expected chemical consumption (coagulants, chlorine etc.), and/or lower recovery than expected. In certain scenarios, in order to prevent instable operation, a conservative design and/or conservative operation regimen is typically applied. However, utilizing the described technologies, pretreatment performance can be improved/optimized. For example, machine learning techniques can perform high level data analysis and optimize the performance of the system. For example chemical consumption of UF can be reduced based on long term data analysis of TMP vs. chemicals dosage. Additionally, improved/optimized CEB can reduce CIP frequency and increase system availability.

By way of further illustration, smart operations engine 504 can process/analyze data, metrics, etc., from the various components of the plant (for example, by monitoring the RO feed pressure, membrane pressure drop, permeate conductivity, etc.) and improve/optimize various operations to lower RO membrane replacement rate. In certain implementations, the calculated normalized production flow and normalized salt passage can also be accounted for. In doing so, smart operations engine 504 can determine, suggest, and/or automatically apply low salinity flushing and/or Cleaning-In-Place procedures. Additionally, using machine learning techniques, smart operations engine 504 can optimize the flushing and cleanings schedule. As a result of such optimization, the appropriate cleaning will be applied on the right time. In doing so, irreversible fouling or scaling developing on the membrane surface can be reduced. As a result, the overall number cleanings and the yearly membranes replacement rate can also be reduced.

By way of further illustration, smart operations engine 504 can process/analyze data, metrics, etc., to adjust RO and ERD duty points. For example, the operational duty point of the RO may be selected based on the required production capacity and the design system recovery. However, smart operations engine 504 can detect (e.g., using ML techniques) operating points with better efficiency and suggest such a duty point adjustment and/or perform such an adjustment automatically (e.g., within predetermined boundaries). For example, data, metrics, etc., such as pump efficiency, ERD efficiency, energy consumption of different RO units, permeate conductivity, etc. can be accounted for by smart operations engine 504 in determining an improved duty point.

By way of further illustration, smart operations engine 504 can process/analyze data, metrics, etc., to adjust, improve, optimize, etc., second pass and post-treatment control. In doing so, chemical dosage overshoot for water chemistry balance can be reduced/minimized. For example, smart operations engine 504 can be configured to monitor real time boron rejection as a function of NaOH dosage and optimize NaOH dosage to reach the designated boron rejection without overdosing of NaOH. Additionally, final pH and Langelier Saturation Index (LSI) can be reached while minimizing NaOH overdosing or CO2 injection.

It can be further appreciated that various plants (e.g., desalination plants) are designed with safety factors such as production capacity, recovery, chemicals injection, flow rates, and maintenance intervals. However, these safety factors may be implemented based on various conservative assumptions which may not be necessary (or accurate) in all settings, contexts, etc. (e.g., with respect to natural seasonal variance regarding feed conditions). Accordingly, the described technologies can enable real-time automated monitoring of the plant and adjustment of plant conditions. As such, the referenced safety factors can be accounted for while further improving/optimizing operation of the plant(s) without compromising maintenance and physical integrity of the plant.

Utilizing the described technologies, real-time and detailed information on a plant's operation and performance, combined with insights drawn from machine learning techniques, can enable remote monitoring and troubleshooting, as well as automatic adjustments. Accordingly, as described herein, the described technologies can provide expert maintenance support and advice (e.g., via remote monitoring/control interfaces), while also detecting malfunctions and recommending/initiating preventative actions. Predictive maintenance techniques can be employed to determine the condition of in-service equipment to predict when maintenance should be performed. This approach can enable various efficiencies over routine or time-based preventive maintenance, because tasks are performed when warranted, when conveniently scheduled, and under less maintenance cycles and frequency. Predictive maintenance allows convenient scheduling of corrective maintenance, while preventing unexpected equipment failures. By knowing which equipment needs maintenance, maintenance work can be better planned (spare parts, people, etc.) and what would have been "unplanned outages" are transformed to shorter and fewer "planned outages", thus decreasing maintenance labor costs and increasing plant availability. The predictive maintenance techniques enabled by the described technologies can considers the actual condition of the equipment, based on the actual operating environment. This can increase time between maintenance procedures in cases of better conditions than average. This can also reduce system failures, when actual conditions are extreme and more frequent maintenance is required.

Implementing the described technologies also enables other advantages such as increased equipment lifetime, increased plant safety, fewer accidents with negative impact on environment, and optimized spare parts handling.

Many plants are designed with redundant/standby process units or trains to guarantee performance and capacity under changing circumstances. The design must assume certain conservative down-time for operation and maintenance (e.g. CIP or maintenance intervals and duration) which may be inefficient or suboptimal. In contrast, the described technologies can provide a smart adaptive control system that monitors the system's condition in real time and provides early fouling detection, allowing shorter and less frequent system shut downs (e.g. for CIP or equipment maintenance). In turn this will allow lower redundancy levels and additional efficiencies.

Systems in which performance is dependent on calibration and tuning, such as desalination plants, can specifically benefit from the described technologies, which can incorporate techniques such as reinforcement learning. By measuring system inputs such as energy, raw water condition, chemicals etc. and comparing them to system outcome such as output water quality, the described technologies can be trained to increase its reward (water quality) while tuning the inputs under some boundaries, such that overall efficiency is increased. The advantage of employing machine learning results from the fact that system conditions are constantly changing and such adaptive algorithms can automatically dynamically determine the operational settings that will yield optimal efficiency.

Additionally, in certain implementations the described technologies can collect and store the described data (e.g., as received from various systems, plants, etc.) in a database (DB) 506. The stored data can reflect, for example, different scenarios, environmental conditions, etc. together with measured operational data under these conditions. Utilizing such data, the described machine learning techniques can be employed (e.g., to 'train' ML models). This enables the trained models to be adaptive and optimized on a given site while leveraging knowledge through data that are collected from other sites.

In certain implementations, an optimized model can be trained for each site and optimized to the specific conditions of that site. The model can then be provided/downloaded into the site for distributed operation, such that each site can work independently (e.g., without dependency on communication with other devices). This approach also enables easier implementation of cybersecurity measures which may be important in case of critical infrastructure such as water.

The described technologies can also be employed to control a cluster of modular/package desalination systems that are operating together as a single plant. For example, multiple containerized seawater desalination products can be combined into mid-size desalination plants of multiple containers in parallel. Balancing load and production from each of the modular units, as well as synchronized predictive maintenance and CIP regime of the different systems can be achieved in an optimal manner using the described technologies. Such overall smart operation and optimization will maximize the benefits inherent in a modular plant such as seasonal capacity changes, redundancy etc.).

It should be understood that the components referenced herein can be combined together or separated into further components, according to a particular implementation. Additionally, in some implementations, various components of a particular element may be distributed across multiple elements.

It should also be noted that while the technologies described herein are illustrated primarily with respect to water desalination, the described technologies can also be implemented in any number of additional or alternative settings or contexts and towards any number of additional objectives.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-5 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 7:
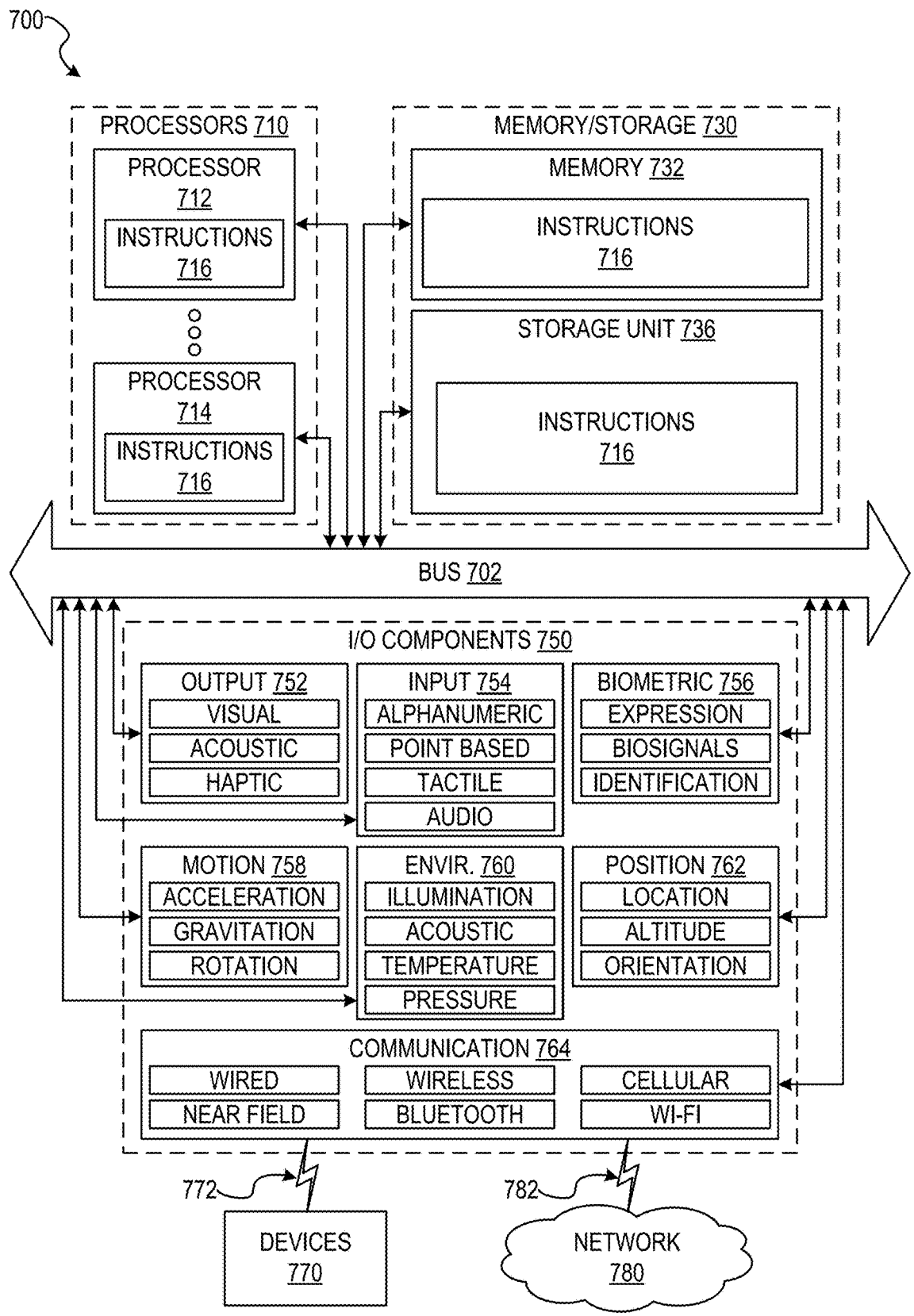
FIG. 7 is a block diagram illustrating components of a machine able to read instructions from a machine-readable medium and perform various methodologies discussed herein, according to an example embodiment.

FIG. 7 is a block diagram illustrating components of a machine 700, according to some example implementations, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. The instructions 716 transform the general, non-programmed machine into a particular machine programmed to carry out the described and illustrated functions in the manner described. In alternative implementations, the machine 700 operates as a standalone device or can be coupled (e.g., networked) to other machines. In a networked deployment, the machine 700 can operate in the capacity of a server machine or a client machine in a server-client network environment, or as a peer machine in a peer-to-peer (or distributed) network environment. The machine 700 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example implementation, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 712 and a processor 714 that can execute the instructions 716. The term "processor" is intended to include multi-core processors that can comprise two or more independent processors (sometimes referred to as "cores") that can execute instructions contemporaneously. Although FIG. 7 shows multiple processors 710, the machine 700 can include a single processor with a single core, a single processor with multiple cores (e.g., a multi-core processor), multiple processors with a single core, multiple processors with multiples cores, or any combination thereof.

The memory/storage 730 can include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions (e.g., instructions 716) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion and the grouping is in no way limiting. In various example implementations, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 750 can include biometric components 756, motion components 758, environmental components 760, or position components 762, among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., accelerometer), gravitation sensor components, rotation sensor components (e.g., gyroscope), and so forth. The environmental components 760 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 762 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 750 can include communication components 764 operable to couple the machine 700 to a network 780 or devices 770 via a coupling 782 and a coupling 772, respectively. For example, the communication components 764 can include a network interface component or other suitable device to interface with the network 780. In further examples, the communication components 764 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 can be another machine or any of a wide variety of peripheral devices (e.g., a peripheral device coupled via a USB).

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 764, such as location via Internet Protocol (IP) geolocation, location via Wi-Fi® signal triangulation, location via detecting an NFC beacon signal that can indicate a particular location, and so forth.

In various example implementations, one or more portions of the network 780 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 can include a wireless or cellular network and the coupling 782 can be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 can be transmitted or received over the network 780 using a transmission medium via a network interface device (e.g., a network interface component included in the communication components 764) and utilizing any one of a number of well-known transfer protocols (e.g., HTTP). Similarly, the instructions 716 can be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A method comprising:
passing water through a reverse osmosis process;
backwashing a first set of ultrafiltration membranes or a second set of ultrafiltration membranes with brine generated by the reverse osmosis process; and
backwashing at least one of the first set of ultrafiltration membranes or the second set of ultrafiltration membranes with one or more chemicals and reverse osmosis permeate,
wherein the brine generated from the reverse osmosis process is directly communicated, through an energy recovery device, to a backwash inlet of a backwashing system of the first set of ultrafiltration membranes.

2. A method for water desalination comprising:
backwashing one or more ultrafiltration membranes with brine generated by a reverse osmosis process;
backwashing one or more ultrafiltration membranes with one or more chemicals and reverse osmosis permeate water; and
operating a plurality of ultrafiltration trains in parallel to one another.

3. The method of claim 1, wherein passing water through a reverse osmosis process further comprises passing the water through one or more filters.

4. The method of claim 3, wherein the one or more filters comprise one or more disc filters.

5. The method of claim 3, wherein the one or more filters are cleaned during an automated cleaning cycle.

6. The method of claim 5, wherein, during the automated cleaning cycle, the one or more filters are decompressed, rinsed, and recompressed.

7. The method of claim 1, wherein the first set of ultrafiltration membranes and the second set of ultrafiltration membranes are configured to filter water that is provided to one or more reverse osmosis membranes that perform the reverse osmosis process.

8. The method of claim 7, wherein the brine is received via a feed from the one or more reverse osmosis membranes.

9. The method of claim 1, wherein backwashing a first set of ultrafiltration membranes or a second set of ultrafiltration membranes comprises treating the first set of ultrafiltration membranes with the brine generated by the reverse osmosis process while the second set of ultrafiltration membranes filters water.

10. The method of claim 1, wherein backwashing at least one of the first set of ultrafiltration membranes or the second set of ultrafiltration membranes comprises treating the first set of ultrafiltration membranes with the one or more chemicals and the reverse osmosis permeate water while the second set of ultrafiltration membranes filters water.

11. The method of claim 1, further comprising performing a rinsing operation upon determining that a reverse osmosis process has stopped for a defined period of time.

12. The method of claim 1, wherein said first set of ultrafiltration membranes and the second set of ultrafiltration membranes operate in parallel.

13. The method of claim 1, comprising periodically backwashing the first set of ultrafiltration membranes.

14. The method of claim 1, comprising continuous operating said reverse osmosis process.

15. The method of claim 1, for desalinating water.

* * * * *